(12) United States Patent
Huang et al.

(10) Patent No.: US 11,594,843 B2
(45) Date of Patent: Feb. 28, 2023

(54) DOCKING STATION

(71) Applicant: SINOX CO., LTD, New Taipei (TW)

(72) Inventors: Yueh-Cheng Huang, New Taipei (TW); Hao-Jhong Lyu, New Taipei (TW)

(73) Assignee: SINOX CO., LTD, New Taipei (TW)

( * ) Notice: Subject to any disclaimer, the term of this patent is extended or adjusted under 35 U.S.C. 154(b) by 43 days.

(21) Appl. No.: 17/136,772

(22) Filed: Dec. 29, 2020

(65) Prior Publication Data

US 2021/0210903 A1  Jul. 8, 2021

Related U.S. Application Data

(60) Provisional application No. 62/956,804, filed on Jan. 3, 2020.

(51) Int. Cl.
| | | |
|---|---|---|
| *H01R 13/639* | (2006.01) | |
| *H01R 13/72* | (2006.01) | |
| *G06F 1/16* | (2006.01) | |
| *H01R 27/02* | (2006.01) | |

(52) U.S. Cl.
CPC ....... *H01R 13/6397* (2013.01); *G06F 1/1632* (2013.01); *H01R 13/72* (2013.01); *H01R 27/02* (2013.01); *H01R 2201/06* (2013.01)

(58) Field of Classification Search
CPC .... H01R 13/6397; H01R 13/72; H01R 27/02; H01R 2201/006; G06F 1/1632
See application file for complete search history.

(56) References Cited

U.S. PATENT DOCUMENTS

| | | | | |
|---|---|---|---|---|
| 6,722,917 B2* | 4/2004 | Huang | ................ | H01R 25/003 |
| | | | | 439/502 |
| 6,780,047 B1* | 8/2004 | Laity | .................... | H01R 13/72 |
| | | | | 439/501 |
| 7,713,073 B2* | 5/2010 | Lin | ......................... | H01R 13/72 |
| | | | | 439/501 |
| 7,746,029 B2* | 6/2010 | Toya | ..................... | H02J 7/0042 |
| | | | | 320/113 |
| 8,043,116 B2* | 10/2011 | Liao | ....................... | H01R 13/74 |
| | | | | 439/535 |
| 8,419,479 B2* | 4/2013 | Vroom | ................ | H01R 13/629 |
| | | | | 439/639 |
| 9,966,700 B2* | 5/2018 | Gee | .................... | H01R 13/6397 |
| 2002/0089822 A1 | 7/2002 | Liao et al. | | |

FOREIGN PATENT DOCUMENTS

JP          2009-20557 A          1/2009

OTHER PUBLICATIONS

British Search Report for British Application No. GB2020718.9, dated May 6, 2021.

* cited by examiner

*Primary Examiner* — Briggitte R. Hammond
(74) *Attorney, Agent, or Firm* — Birch, Stewart, Kolasch & Birch, LLP

(57) ABSTRACT

A docking station includes a base and a first cable. The base has a plurality of ports. One end of the first cable connects to the base and the other end of the first cable connects to a first lock set.

7 Claims, 12 Drawing Sheets

DOCKING STATION

CROSS REFERENCE TO RELATED APPLICATION

This non-provisional application claims the benefit under 35 U.S.C. § 119(e) to U.S. Provisional Application No. 62/956,804, filed on Jan. 3, 2020, all of which is hereby expressly incorporated by reference into the present application.

BACKGROUND

Field of the Invention

The present invention generally relates to a docking station. More particularly, the present invention relates to a docking station capable of locking an electronic device.

Related Art

In modern life, consumer electronic products play an important role. With a fast-paced lifestyle and the demand for instant information, portable electronic products have become one of the necessities of life. And a user can connect an electronic device to a docking station to expand the usage of electronic devices and/or to make connecting electronic devices more convenient.

However, due to relatively high unit price and the ease of cashing out, these products are more likely to be stolen or robbed. In order to prevent others from stealing these products, electronic device locks are designed. Among them is a notebook computer lock that may be connected to an anti-theft lock hole of an electronic product through a lock fastener of the notebook computer lock, and the movement of the lock fastener is controlled through a key lock mechanism to complete the locking/unlocking. However, to do so, the user has to carry the electronic device lock, which is inconvenient.

SUMMARY OF THE INVENTION

A docking station includes a base and a first cable. The base has a plurality of ports. One end of the first cable connects to the base and the other end of the first cable connects to a first lock set.

In one embodiment, the first cable can be accommodated in the base.

In one embodiment, the base includes a concave portion. The first lock set can be fixed in the concave portion when the first cable is accommodated in the base.

In one embodiment, the base includes a cover plate disposed outside the concave portion.

In one embodiment, the docking station further includes a cable collecting device disposed in the base for accommodating the first cable in the base.

In one embodiment, the cable collecting device includes a reel having automatic reeling function.

In one embodiment, the base includes a base lock disposed in the base and a base lock hole disposed on the surface of the base. One end of a second cable can be inserted into the base lock hole and locked by the base lock.

In one embodiment, the docking station further includes a first cable module separably disposed in the base. The first cable module includes a module casing, wherein the first cable can be accommodated in the module casing.

In one embodiment, an engaging bump is disposed on one side of the module casing. An engaging hole is disposed on one side of the base. The engaging bump protrudes out of the base through the engaging hole to make the first cable module engage with the base when the first cable module is disposed in the base.

In one embodiment, the base further includes a hallow buckle having a hollow portion. The first cable is capable of passing through the hallow buckle via the hallow portion.

DETAILED DESCRIPTION

Figure 1A:
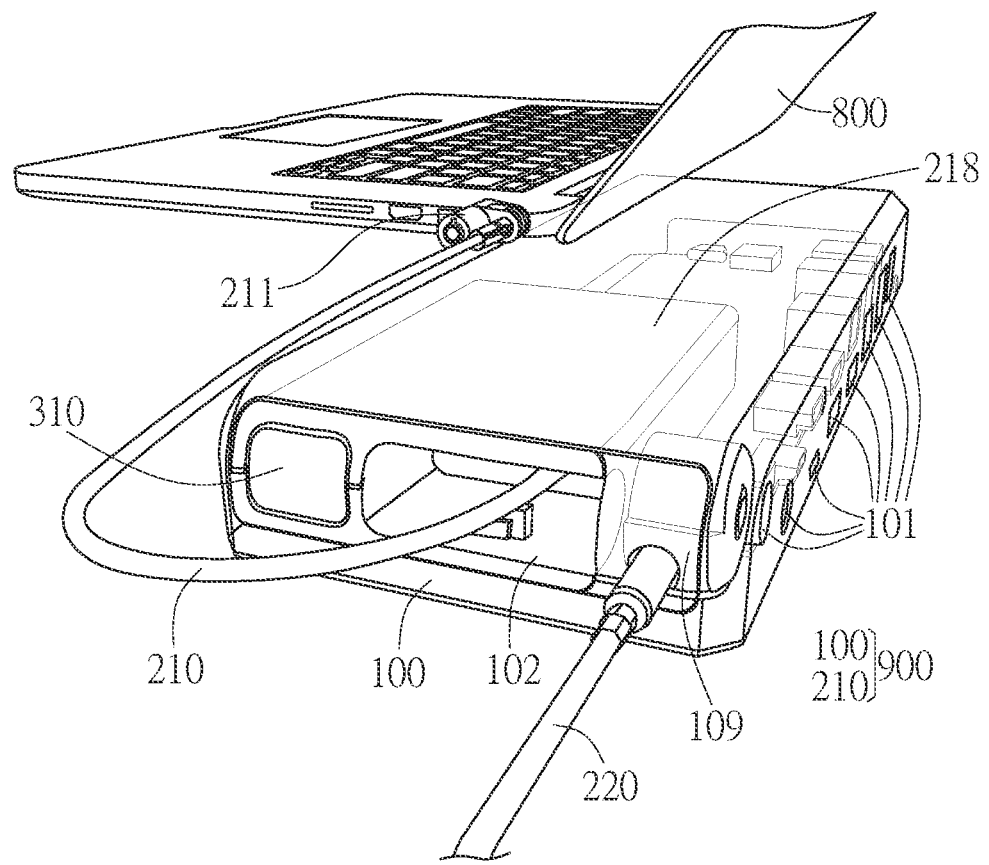
FIG. 1A is a perspective view of an embodiment of the docking station of the present invention.

As shown in the embodiment in FIG. 1A, the docking station 900 of the present invention includes a base 100 and a first cable 210. The base 100, such as a port replicator or a hub, has a plurality of ports 101 to connect to electronic devices 800, power supplies, displays, interface operating devices (e.g. keyboards, mice), data accessing devices (e.g. memory card readers, disc players), data storage devices (e.g. hard drives, memory cards, flash disks), etc. One end of the first cable 210 connects to the base 100 and the other end of the first cable 210 connects to a first lock set 211. In this embodiment, the electronic device 800 is a laptop having an anti-theft lock hole, wherein the first lock set 211 is a laptop lock which can be locked in the anti-theft lock hole. The first lock set 211 can be a key lock, a combination lock, or other kinds of lock. In different embodiments, different choices regarding the first lock set 211 can be made with respect to the electronic device 800. For example, the first lock set 211 can be a frame lock when the electronic device 800 is a tablet. Accordingly, the user can directly lock the electronic device 800 with the first lock set 211 of the docking station 900 to prevent others from stealing the electronic device 800 without carrying an additional lock. Hence, it is more convenient to use. Moreover, the user can wind and fix the first cable 210 on a large object such as a desk or a cabinet and then lock the electronic device 800 with the first lock set 211. As such, the electronic device 800 locked with the docking station 900 is further locked with the large object.

Figure 1B:
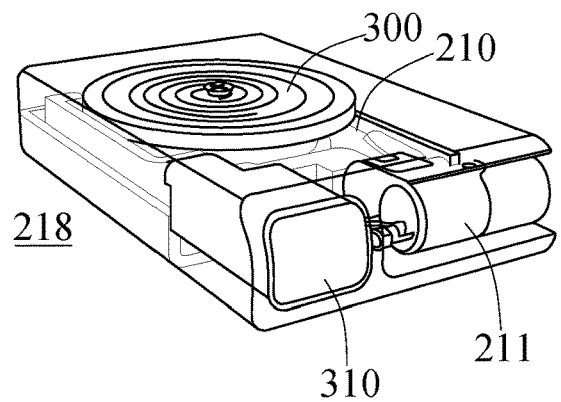
FIG. 1B is a perspective view of an embodiment of the docking station of the present invention including the reel.
Figure 1C:
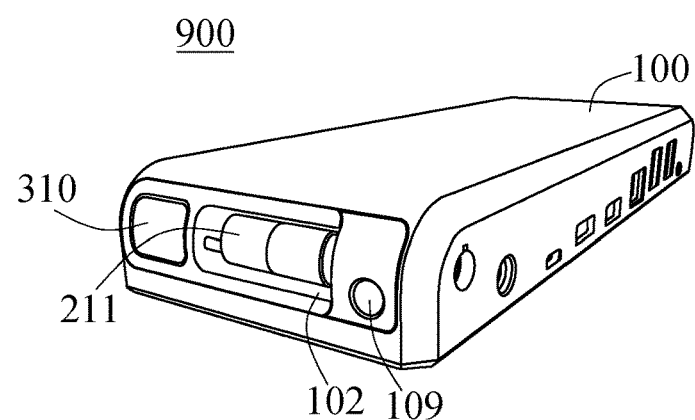
FIG. 1C is a perspective view showing that the first lock set is fixed in the concave portion.
Figure 1D:
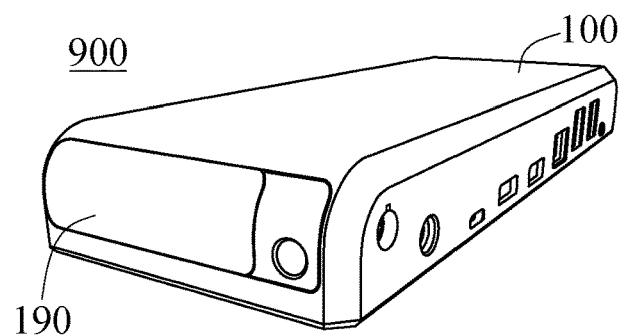
FIG. 1D is a perspective view showing that the cover plate covers the first lock set.

As shown in the embodiments in FIGS. 1B and 1C, the first cable 100 can be accommodated in the base 100 to save space and keep neat. More particularly, as shown in the embodiments in FIGS. 1B and 1C, the first lock set 211 can be fixed in the concave portion 102 when the first cable 210 is accommodated in the base 100 for the user to use it more conveniently. On the other hand, as shown in the embodiment in FIG. 1D, a cover plate 190 can be disposed outside the concave portion 102 to cover the first lock set 211 to make the docking station 900 more artistic in appearance.

Figure 2A:
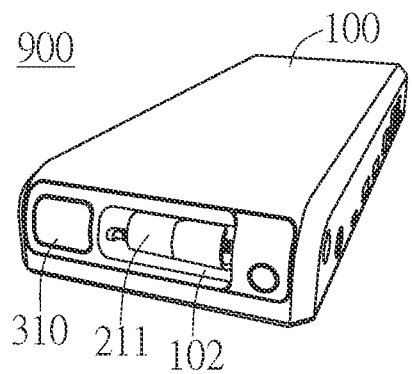
FIGS. 2A to 2C are perspective views showing that the first cable is pulled out of the base.
Figure 2B:
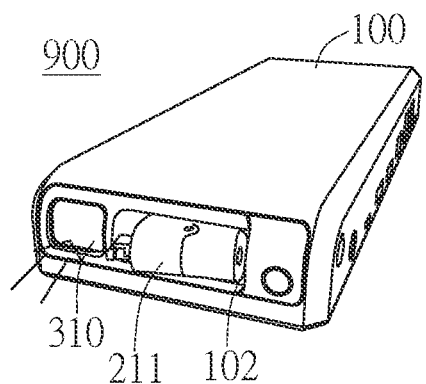
Figure 2C:
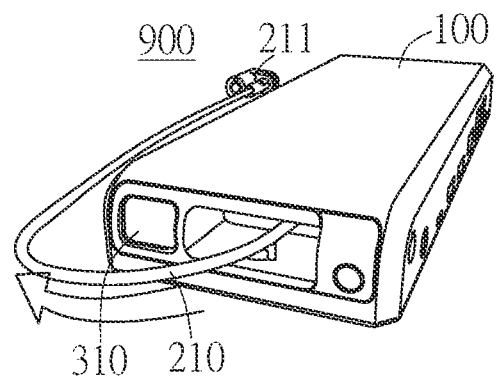

As shown in the embodiment in FIG. 1B, the docking station 900 can further include a cable collecting device 300 disposed in the base 100. One end of the first cable 210 is connected to the cable collecting device 300, wherein the first cable 210 can be accommodated in the base 100 by the cable collecting device 300. More particularly, as shown in the embodiment in FIG. 1B, the cable collecting device 300 includes a reel. As shown in the embodiments in FIGS. 2A to 2B, the user can press the control button to eject the first lock set 211 from the concave portion 102 and further pull the first cable 210 to a desired length from the base 100, as shown in FIG. 2C. On the other hand, the reel, i.e. the cable collecting device 300, preferably includes an automatic reeling function. The first cable 210 can be reeled back into the base 100 automatically when the user presses the control button 310. In different embodiments, the cable collecting device 300 can be a handle wheel.

Figure 3A:
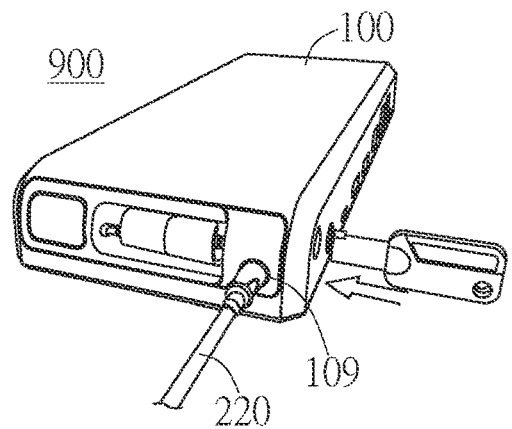
FIGS. 3A to 3C are perspective views showing that the base lock hole is used with the second cable.
Figure 3B:
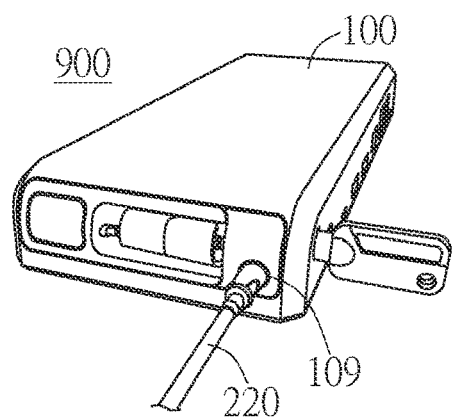
Figure 3C:
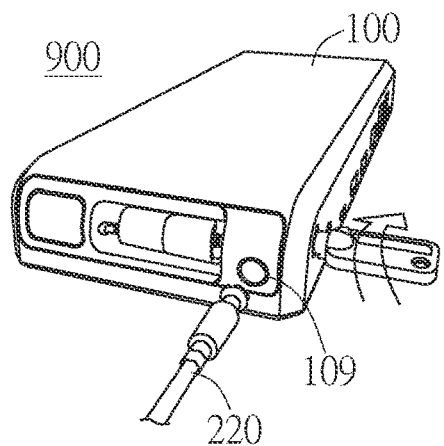
Figure 4A:
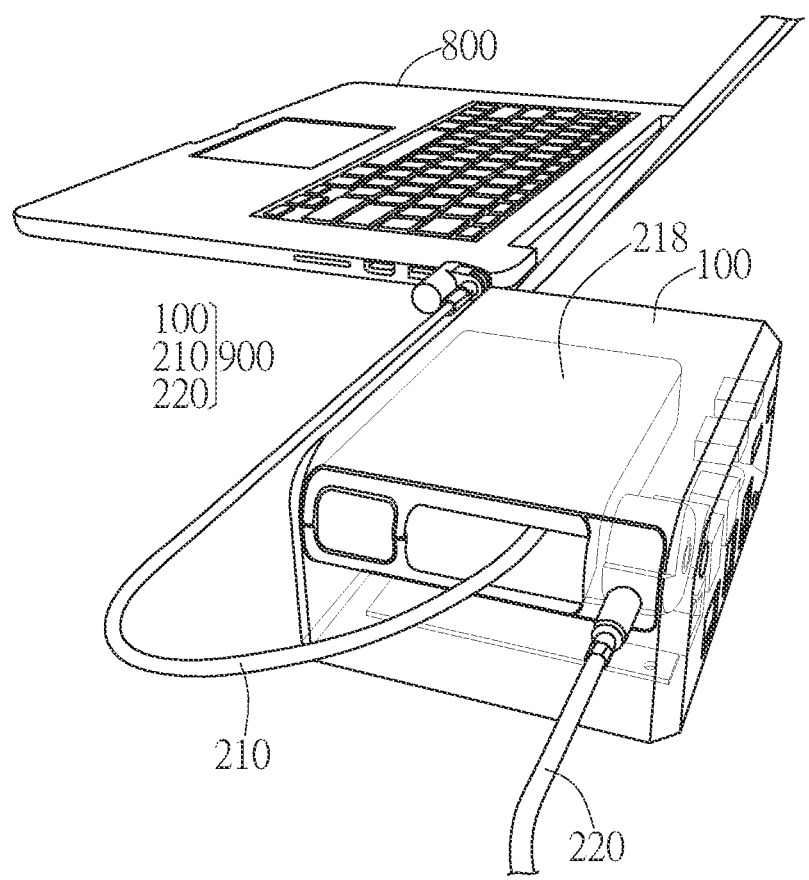
FIGS. 4A to 6C are perspective views of different embodiments of the docking station of the present invention.
Figure 4B:
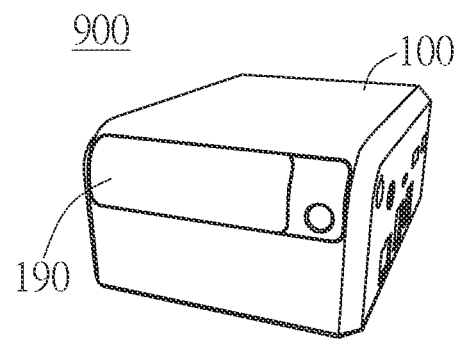
Figure 4C:
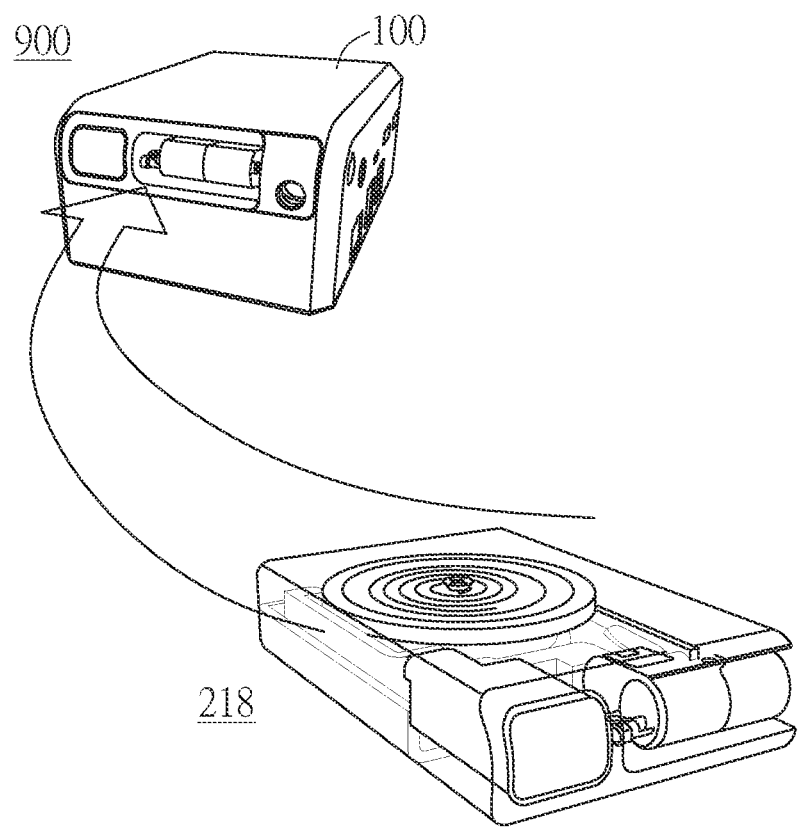
Figure 5A:
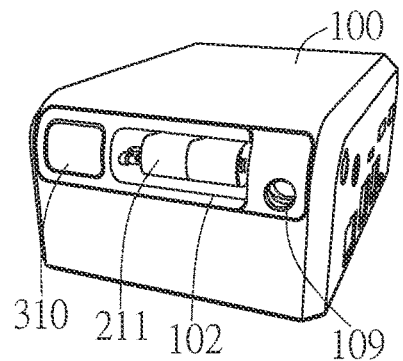
Figure 5B:
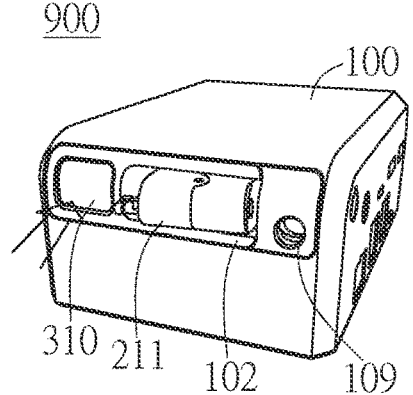
Figure 5C:
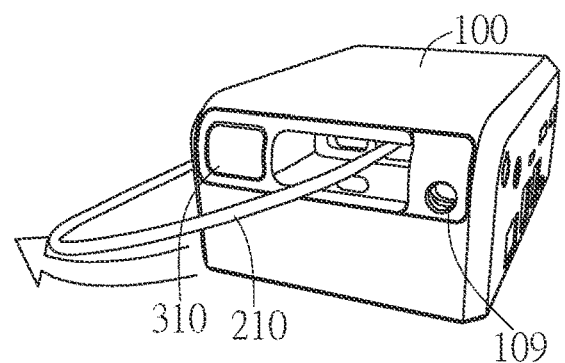
Figure 6A:
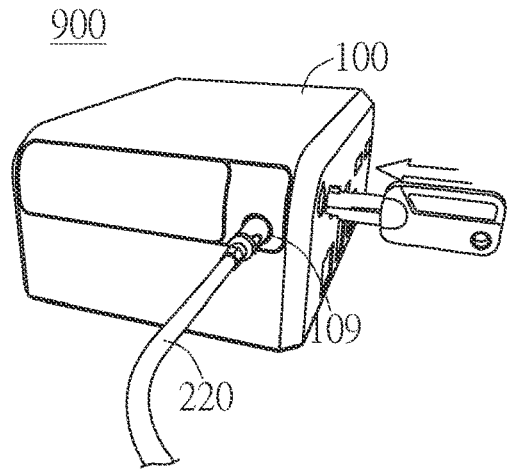
Figure 6B:
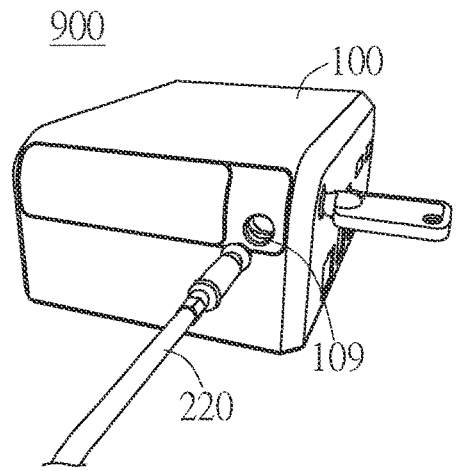
Figure 6C:
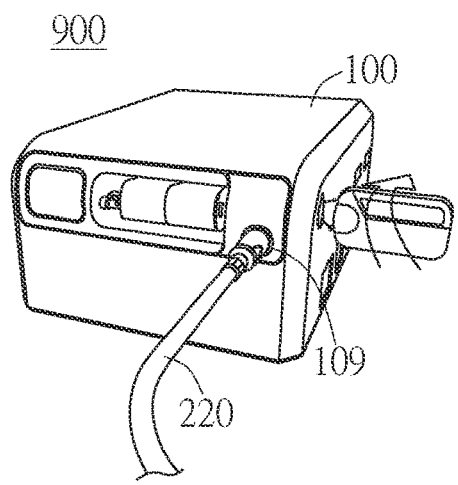

As shown in the embodiments in FIGS. 3A to 3B, the base 100 includes a base lock disposed in the base 100 and a base lock hole 109 disposed on the surface of the base 100. The base lock can be a key lock, a combination lock, or other kinds of lock. One end of the second cable 220 can be inserted into the base lock hole 109 and locked by the base lock. The other end of the second cable 220 can be fixed on a large object such as a desk or a cabinet. As shown in the embodiment in FIG. 3C, the second cable 220 can leave the base lock hole 109 when the base lock is unlocked. In other words, the docking station 900 is locked with the electronic device and the large object via the first cable 210 and the second cable 220 respectively. The user can operate them independently and hence it is more convenient for the user.

As shown in the embodiments in FIGS. 4A to 6C, the base 100 can be modified to have different internal arrangement and corresponding outer appearance according to the manufacturing, design, and usage requirements. For example, the volume of the base 100 could be increased if the same has energy storage devices such as batteries.

Figure 7A:
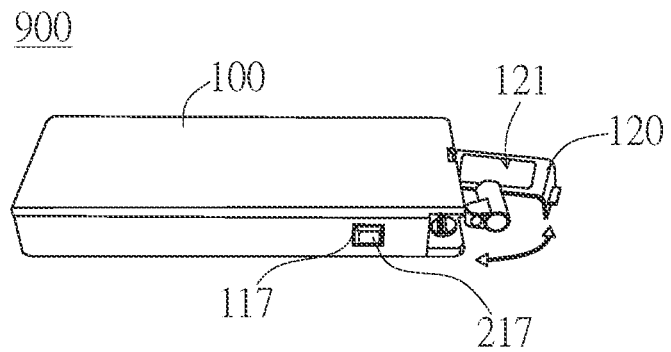
FIGS. 7A to 7C are perspective views of an embodiment of the docking station of the present invention containing the first cable module.
Figure 7B:
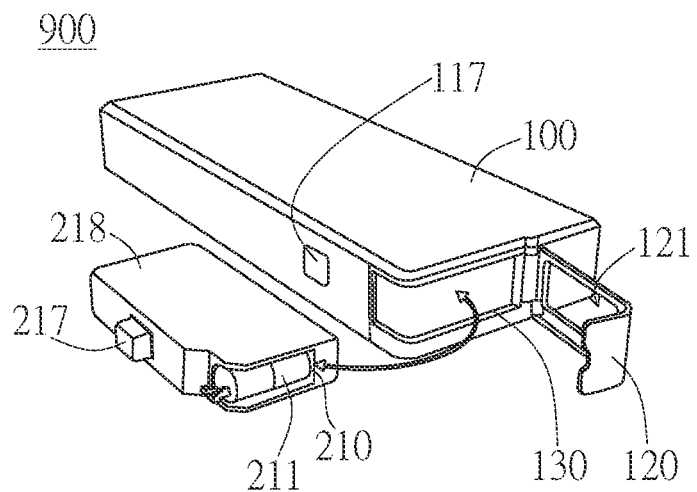

As shown in the embodiments in FIGS. 7A to 7B, the docking station 900 can further include a first cable module 218 separably disposed in the base 100. The first cable module 218 includes a module casing 212 and the first cable 210, which can be accommodated in the module casing 212. An engaging bump 217 is disposed on one side of the module casing 212. An engaging hole 117 is disposed on one side of the base 100. The engaging bump 217 protrudes out of the base 100 through the engaging hole 117 to make the first cable module 218 engage with the base 100 when the first cable module 218 is disposed in the base 100. On the other hand, the user can press the engaging bump 217 to remove it from the engaging hole 117 to release the engagement between the first cable module 218 and the base 100. More particularly, different choices regarding the first lock set 211 can be made with respect to the electronic device 800. In this embodiment, replacing the first lock set 211 would be more convenient via the separable first cable module 218. In other words, the user/consumer end can select and install a suitable first cable module 218 in the base 100, while the seller/manufacturer end can make the docking station 900 work with multiple specifications of first cable module 218.

Figure 7C:
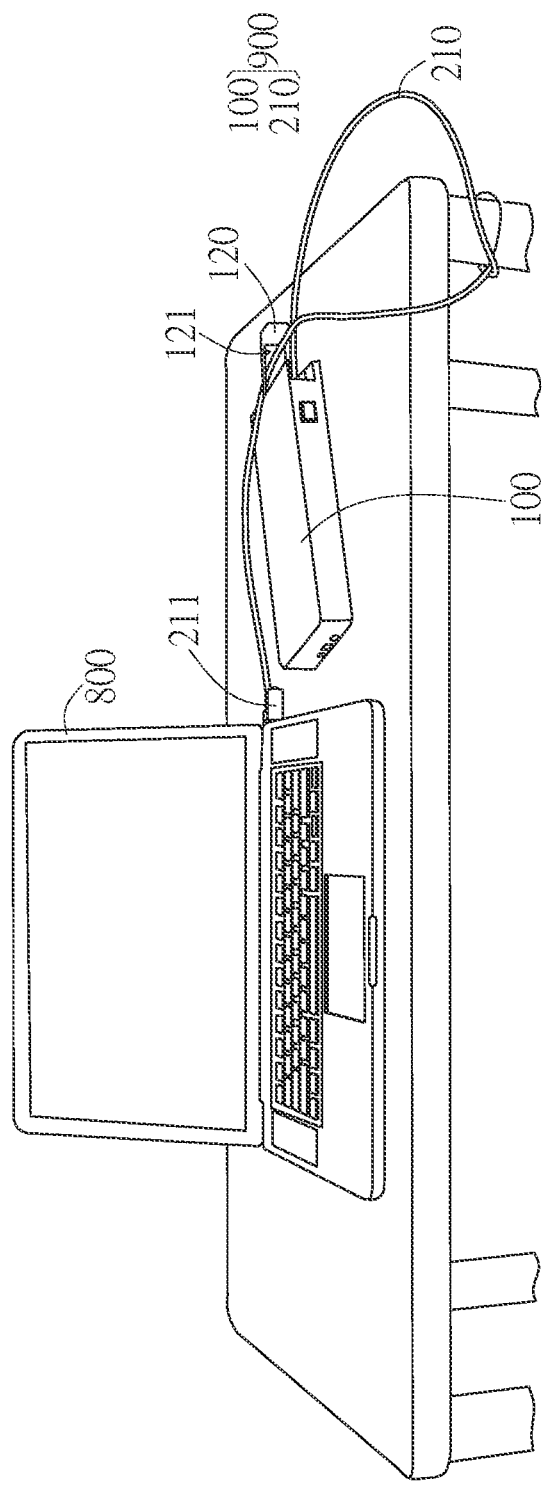
Figure 8A:
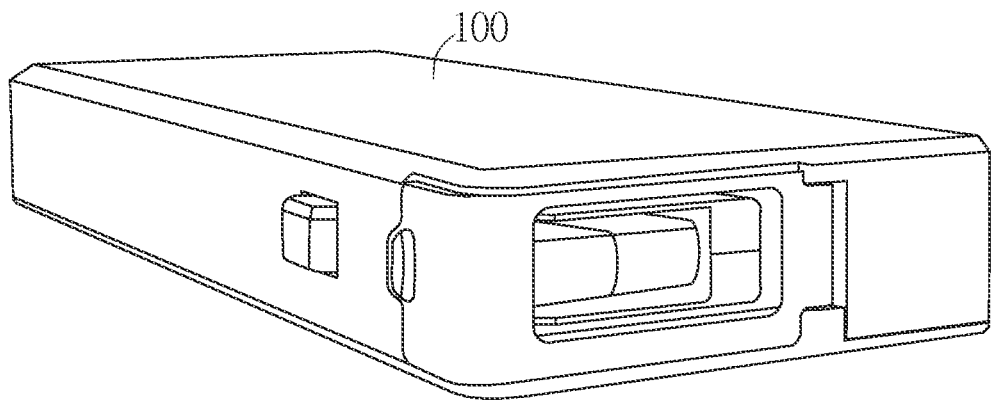
FIGS. 8A to 8D are perspective views of different embodiments of the docking station of the present invention.
Figure 8B:
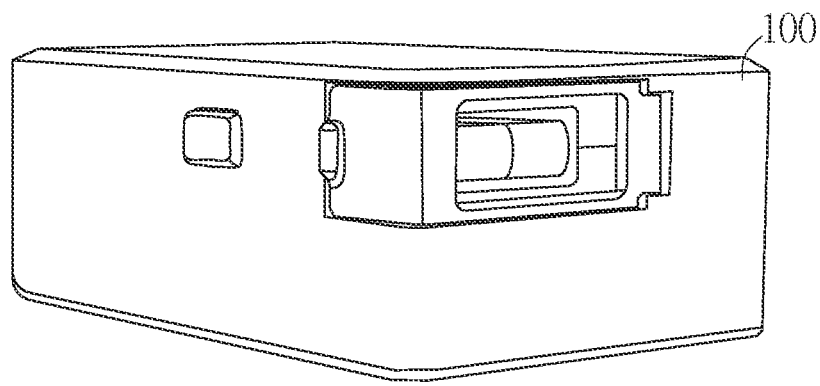
Figure 8C:
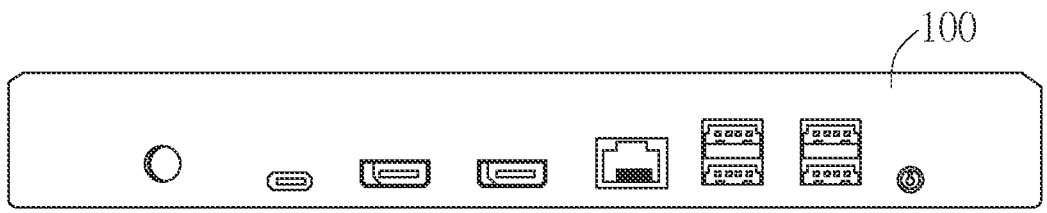
Figure 8D:
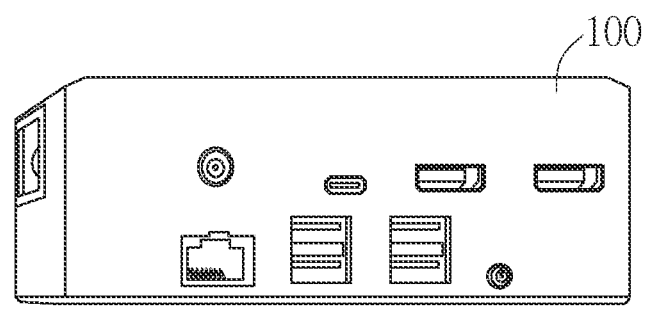

As shown in the embodiments in FIGS. 7A to 7C, the base 100 further includes a hallow buckle 120 having a hollow portion 121. As shown in the embodiment in FIG. 7C, the first cable 210 can passes through the hollow portion 121, winds and fixes the on a large object such as a desk or a cabinet and then lock the electronic device 800 with the first lock set 211. As such, the base 100, the first cable module 218 separated from the base 100, and the electronic device 800 locked with the docking station 900 are all locked with the large object. As shown in the embodiments in FIGS. 7A to 7B, the base 100 further includes a hallow buckle 120 having a hollow portion 121. More particularly, with this design, the user can decide whether to separate the first cable module 218 from the base 100. For example, under the consideration to reduce the number of items to carry in order to increase mobility for a short trip, the user can separate the first cable module 218 from the base 100 and carry only the first cable module 218, which has the function of locking the electronic device 800.

As shown in the embodiments in FIGS. 8A to 8D, the base 100 can be modified to have different internal arrangement and corresponding outer appearance according to the manufacturing, design, and usage requirements. For example, the length or the thickness of the base 100 could be increased if the same has a longer or thicker first cable module.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

SYMBOLS

100 . . . base
101 . . . port
102 . . . concave portion
109 . . . base lock hole
117 . . . engaging hole
120 . . . hallow buckle
121 . . . hollow portion
190 . . . cover plate
210 . . . the first cable
211 . . . first lock set
212 . . . module casing
217 . . . engaging bump
218 . . . first cable module
220 . . . second cable
300 . . . cable collecting device
310 . . . control button
800 . . . electronic device
900 . . . docking station

What is claimed is:

1. A docking station, comprising:
a base having a plurality of ports;
a first cable extending outward from inside the base and connecting to a first lock set, wherein the first cable can be accommodated and concealed in the base; and
a first cable module separably disposed in the base, wherein the first cable module includes a module casing and the first cable capable of being accommodated in the module casing, wherein an engaging bump is disposed on one side of the module casing, wherein an engaging hole is disposed on one side of the base, wherein the engaging bump protrudes out of the base through the engaging hole to make the first cable module engage with the base when the first cable module is disposed in the base.

2. The docking station according to claim 1, wherein the base includes a concave portion, wherein the first lock set is capable of being fixed in the concave portion when the first cable is accommodated in the base.

3. The docking station according to claim 2, wherein the base includes a cover plate disposed outside the concave portion.

4. The docking station according to claim 1, further comprising a cable collecting device disposed in the base for accommodating the first cable in the base.

5. The docking station according to claim 4, wherein the cable collecting device includes a reel having automatic reeling function.

6. The docking station according to claim 1, wherein the base includes a base lock disposed in the base and a base lock hole disposed on the surface of the base, wherein one end of a second cable is capable of being inserted into the base lock hole and locked by the base lock.

7. The docking station according to claim 1, wherein the base further includes a hallow buckle having a hollow portion, wherein the first cable is capable of passing through the hallow buckle via the hallow portion.

* * * * *